US012640074B2

(12) United States Patent
Liang

(10) Patent No.: US 12,640,074 B2
(45) Date of Patent: May 26, 2026

(54) GAMMA TUNING METHOD AND APPARATUS THEREOF, AND DISPLAY APPARATUS

(71) Applicants: Wuhan Tianma Micro-Electronics Co., Ltd., Wuhan (CN); Wuhan Tianma Micro-Electronics Co., Ltd. Shanghai Branch, Shanghai (CN)

(72) Inventor: Xiaozhong Liang, Wuhan (CN)

(73) Assignees: Wuhan Tianma Micro-Electronics Co., Ltd., Wuhan (CN); Wuhan Tianma Micro-Electronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/952,521

(22) Filed: Nov. 19, 2024

(65) Prior Publication Data

US 2025/0218327 A1 Jul. 3, 2025

(30) Foreign Application Priority Data

Jan. 2, 2024 (CN) ......................... 202410008456.6

(51) Int. Cl.
*G09G 3/20* (2006.01)

(52) U.S. Cl.
CPC ... *G09G 3/2007* (2013.01); *G09G 2320/0276* (2013.01); *G09G 2320/0626* (2013.01); *G09G 2320/0673* (2013.01)

(58) Field of Classification Search
CPC ......... G09G 3/2007; G09G 2320/0276; G09G 2320/0626; G09G 2320/0673; G09G 3/36; G09G 3/20
See application file for complete search history.

(56) References Cited

U.S. PATENT DOCUMENTS 7,081,899 B2 * 7/2006 Shimazaki ............. G09G 5/006 345/589
8,605,125 B2 * 12/2013 Kim ..................... G09G 3/3258 345/89
8,711,136 B2 * 4/2014 Park ....................... G09G 3/006 345/204
9,984,610 B2 * 5/2018 Ahn ......................... H04N 9/69
10,102,802 B2 * 10/2018 Kwon .................. G09G 3/3233
10,733,936 B2 * 8/2020 Lee ...................... G09G 3/2077
10,854,153 B2 * 12/2020 Huang ................. G09G 3/3607
11,663,960 B2 * 5/2023 Hashimoto .......... G09G 3/3283 345/214
11,862,077 B2 * 1/2024 Yang .................... G09G 3/2003
2003/0197709 A1 * 10/2003 Shimazaki ............... G09G 5/04 345/590

(Continued)

FOREIGN PATENT DOCUMENTS

CN 108242216 A 7/2018
TW I446324 B 7/2014

*Primary Examiner* — Michael J Jansen, II
(74) *Attorney, Agent, or Firm* — Anova Law Group, PLLC

(57) ABSTRACT

The present disclosure includes a gamma tuning method, a gamma tuning apparatus, and a display apparatus. The gamma tuning method includes defining a first interval, where a target gamma curve at least includes the first interval; and in the first interval, grayscale values and target brightness values have a linear functional relationship; obtaining the linear functional relationship; generating the target gamma curve; and programing the target gamma curve.

17 Claims, 11 Drawing Sheets

(56) References Cited

U.S. PATENT DOCUMENTS

| | | | | |
|---|---|---|---|---|
| 2012/0200608 | A1* | 8/2012 | Kim | G09G 3/3258<br>382/164 |
| 2013/0135272 | A1* | 5/2013 | Park | G09G 3/3233<br>345/211 |
| 2015/0097872 | A1* | 4/2015 | Jeong | G09G 3/3225<br>345/77 |
| 2017/0110044 | A1* | 4/2017 | Ahn | G09G 3/2003 |
| 2017/0193900 | A1* | 7/2017 | Kwon | G09G 3/3275 |
| 2018/0182297 | A1* | 6/2018 | Lee | G09G 3/2077 |
| 2020/0126499 | A1* | 4/2020 | Huang | G09G 3/3607 |
| 2022/0415251 | A1* | 12/2022 | Yang | G09G 3/2096 |
| 2023/0057215 | A1* | 2/2023 | Hashimoto | G09G 3/2011 |
| 2024/0339064 | A1* | 10/2024 | Lin | G09G 3/2074 |
| 2025/0218327 | A1* | 7/2025 | Liang | G09G 3/2007 |

* cited by examiner

GAMMA TUNING METHOD AND APPARATUS THEREOF, AND DISPLAY APPARATUS

CROSS-REFERENCE TO RELATED APPLICATION

The present disclosure claims the priority of Chinese Patent Application No. 202410008456.6, filed on Jan. 2, 2024, the content of which is incorporated herein by reference in its entirety.

TECHNICAL FIELD

The present disclosure generally relates to the field of display technology and, more particularly, relates to a gamma tuning method and an apparatus thereof, and a display apparatus.

BACKGROUND

Gamma tuning is a process in display module production. After a panel structure in a display module is completed and before the display module is shipped from the factory, gamma tuning needs to be performed on the display module. The purpose of the gamma tuning is to adapt the display effect of the display module to the nonlinear perception feature of brightness by human eyes.

In the existing technology, most display modules are tuned according to a gamma curve with a gamma value of 2.2 (i.e., gamma2.2). However, due to algorithm errors and other reasons, after the display module is tuned based on the gamma curve calculated and fitted by a driving chip, a large difference is between actual brightness and target brightness at certain grayscale values, which may affect the display effect of the display module.

SUMMARY

One aspect of the present disclosure provides a gamma tuning method. The gamma tuning method includes defining a first interval, where a target gamma curve at least includes the first interval; and in the first interval, grayscale values and target brightness values have a linear functional relationship; obtaining the linear functional relationship; generating the target gamma curve; and programing the target gamma curve.

Another aspect of the present disclosure provides a gamma tuning apparatus. The gamma tuning apparatus includes a plug-in module, where the plug-in module is electrically connected to a driving chip and includes a calculation unit and an output unit. The calculation unit is configured to define a first interval of a target gamma curve, where in the first interval, grayscale values and target brightness values have a linear functional relationship; the output unit is configured to obtain the linear functional relationship, generate the target gamma curve and transmit the target gamma curve to the driving chip; and the driving chip is configured to program the target gamma curve.

Another aspect of the present disclosure provides a display apparatus including a gamma tuning apparatus. The gamma tuning apparatus includes a plug-in module, where the plug-in module is electrically connected to a driving chip and includes a calculation unit and an output unit. The calculation unit is configured to define a first interval of a target gamma curve, where in the first interval, grayscale values and target brightness values have a linear functional relationship; the output unit is configured to obtain the linear functional relationship, generate the target gamma curve and transmit the target gamma curve to the driving chip; and the driving chip is configured to program the target gamma curve.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

Figure 1:
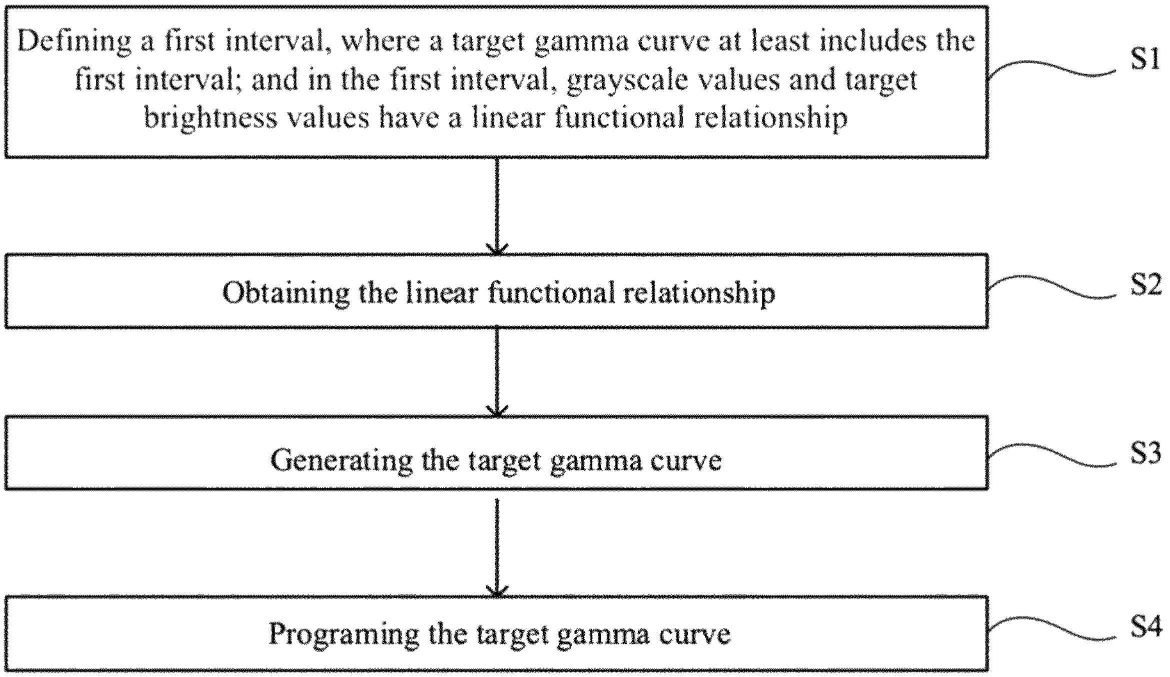
FIG. 1 illustrates a flowchart of a gamma tuning method according to various embodiments of the present disclosure.

Various exemplary embodiments of the present disclosure are described in detail with standard to accompanying drawings. It should be noted that unless stated otherwise, relative arrangement of assemblies and steps, numerical expressions and values described in those embodiments may not limit the scope of the present disclosure.

Following description of at least one exemplary embodiment may be merely illustrative and may not be configured to limit the present disclosure and its application or use.

The technologies, methods and apparatuses known to those skilled in the art may not be discussed in detail, but where appropriate, the technologies, methods and apparatuses should be considered as a part of the present disclosure.

In all examples shown and discussed herein, any specific value should be interpreted as merely exemplary, rather than as a limitation. Therefore, other examples in exemplary embodiment may have different values.

It should be noted that similar standard numerals and letters are configured to indicate similar items in following drawings. Therefore, once an item is defined in one drawing, it does not need to be further discussed in subsequent drawings.

The human eyes are much more sensitive to brightness in darker environment than in brighter environment. Therefore, the relationship between human eye perception and brightness is not linear. For example, the brightness has increased by 2 times, but the human eyes cannot feel that the brightness has been increased by 2 times and only feel that the brightness has increased slightly. When the brightness has increased by 8 times or more, the human eyes may feel that the brightness at this point has increased by 2 times compared to the original brightness. Therefore, in order to make the display effect of the display apparatus to be consistent with the visual experience of human eyes, gamma tuning needs to be performed on the display apparatus. For example, gamma tuning may be performed on the display apparatus before being shipped from the factory, such that, it determines needed driving voltage for each grayscale value of the display apparatus in each gamma band.

The display brightness of the display panel has the plurality of brightness levels. Under different brightness levels, the maximum grayscales of the display panel correspond to different brightness. Taking the display panel supporting a total of 256 grayscales from 0 to 255 as an example, when the display brightness levels of the display panel are divided into 10 brightness levels from band0 to band9, the display brightness corresponding to 256 grayscales gradually increases from the first brightness level band0 to the 10th brightness level band9.

For example, corresponding relationship between grayscale and brightness is expressed by the following formula:

$$LvGrayi=LvGmaxi\times(n/Gmax)^{\gamma}$$

where LvGrayi denotes the brightness corresponding to the grayscale n at the i-th brightness level, LvGmaxi denotes the brightness corresponding to maximum grayscale at the i-th brightness level, Gmax denotes maximum grayscale, and $\gamma$ is a constant. For example, standard gamma curve of gamma 2.2 may be configured to express the correspondence between brightness and grayscale. At this point, the value of above-mentioned $\gamma$ is 2.2.

Currently, limited by the calculation power of the driving chip, the standard gamma curve is calculated and fitted by obtaining a certain number of binding point grayscales. The number of binding point grayscales is far less than the number of grayscales that the display panel may display. For example, 20 grayscales may be selected from a total of 256 grayscales from 0 to 255 as binding point grayscales. Due to algorithm errors and other reasons, the gamma curve calculated and fitted by the driving chip based on the binding point grayscales may deviate from the standard gamma curve that needs to be fitted. Therefore, after the display panel is tuned according to the gamma curve calculated and fitted based on the binding point grayscales, deviation may be between actual gamma curve displayed by the display panel and the standard gamma curve that needs to be generated, which may affect the display effect.

In order to at least solve above-mentioned technical problems, embodiments of the present disclosure provide a gamma tuning method and its apparatus, and a display apparatus. The gamma tuning method and its apparatus, and the display apparatus provided by embodiments of the present disclosure are described in detail with standard to accompanying drawings and specific implementation manners hereinafter.

FIG. 1 illustrates a flowchart of a gamma tuning method according to various embodiments of the present disclosure. Referring to FIG. 1, embodiments of the present disclosure provide a gamma tuning method for performing gamma tuning on the display panel to be shipped. The gamma tuning method may include following exemplary steps.

At S1, the first interval may be defined, where a target gamma curve may at least include the first interval, where in the first interval, the grayscale values and the target brightness values may have linear functional relationship.

At above-mentioned exemplary step S1, the first interval of the target gamma curve may be determined first, that is, the first interval of the target gamma curve to be formed may be determined first. In the first interval, the grayscale values and the target brightness values may have linear functional relationship.

At S2, linear functional relationship may be obtained.

At above-mentioned exemplary step S2, after determining the first interval in the target gamma curve to be formed, corresponding linear function relationship may be determined based on the relationship between the grayscale values and the target brightness values in the first interval.

At S3, the target gamma curve may be generated.

At above-mentioned exemplary step S3, after obtaining linear functional relationship of the first interval, the target gamma curve may be generated based on linear functional relationship of the first interval.

At S4, a target gamma curve may be programmed.

At above-mentioned exemplary step S4, the target gamma curve generated in previous exemplary step may be programmed, and the display panel may be tuned based on the target gamma curve.

In the existing technology, after the display panel is tuned according to the gamma curve calculated and fitted based on the binding point grayscales, deviation may be between actual gamma curve displayed by the display panel and the standard gamma curve that needs to be generated. In the gamma tuning method provided by embodiments of the present disclosure, the target gamma curve that is close to the standard gamma curve may be generated. Therefore, after the display panel is tuned based on the target gamma curve, it is beneficial for improving the display effect of the display panel. For example, in the gamma tuning method provided by embodiments of the present disclosure, the first interval of the target gamma curve may be defined based on the deviation between actual gamma curve and the standard gamma curve. In the first interval, actual brightness may deviate greatly from the standard brightness that needs to be achieved. Therefore, the first interval may be configured in the target gamma curve. In the first interval, the grayscale values and the target brightness values have linear functional relationship. Therefore, the target gamma curve may be closer to the standard gamma curve than actual gamma curve; and the deviation between actual brightness of the display panel after tuning based on the target gamma curve and standard brightness that needs to be achieved may be effectively reduced, thereby effectively improving the display effect of the display panel.

Figure 2:
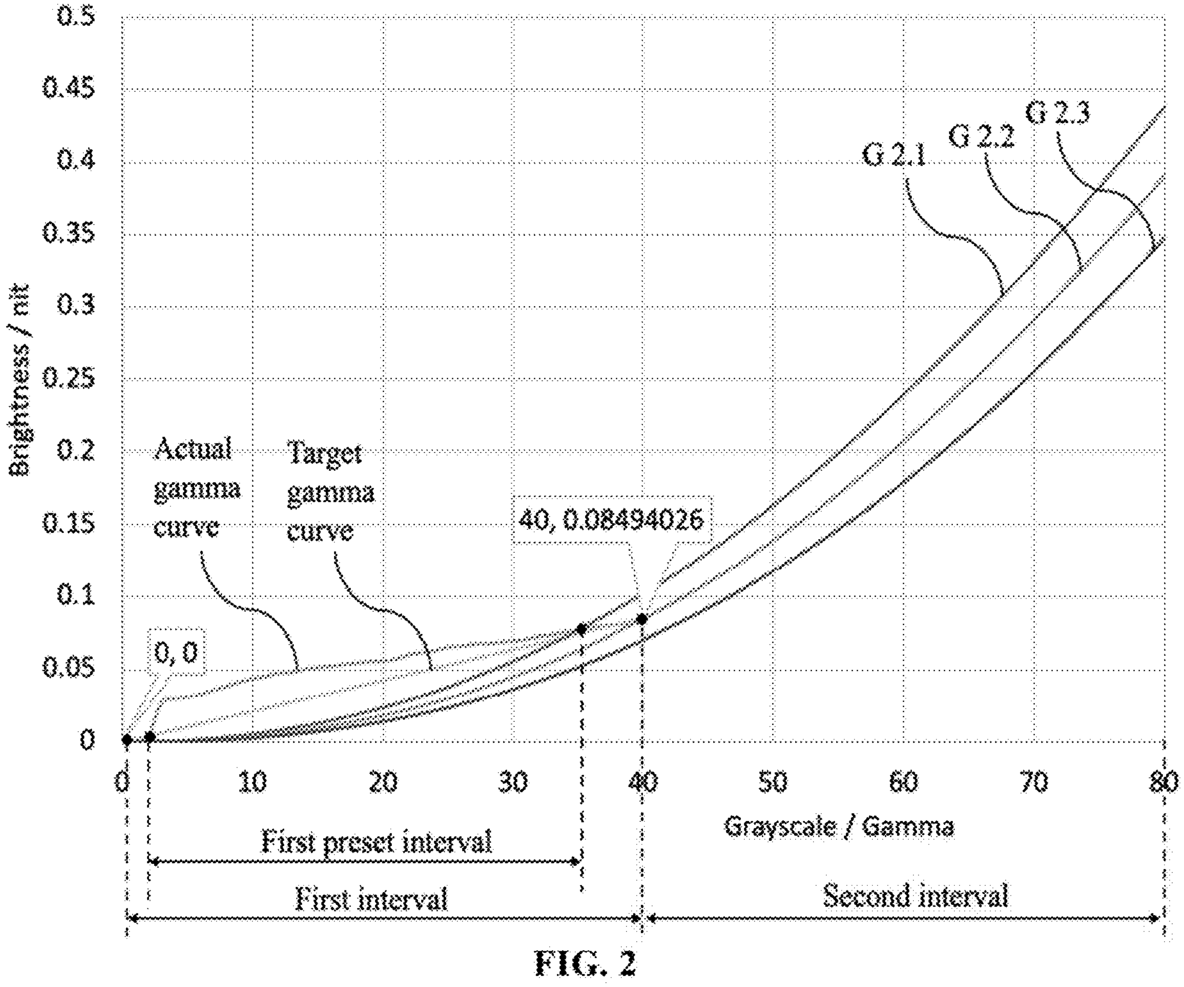
FIG. 2 illustrates a schematic of a gamma curve according to various embodiments of the present disclosure.

Exemplarily, referring to FIG. 2, FIG. 2 illustrates a schematic of a gamma curve according to various embodiments of the present disclosure. At 0-40 grayscales, actual brightness may deviate greatly from standard brightness that needs to be achieved. The configuration range of the first interval may be 0-40 grayscales. At the 0-40 grayscales, the grayscale values and the target brightness values may have linear functional relationship, such that the target gamma curve may be closer to the standard gamma curve than actual gamma curve.

It should be noted that FIG. 2 exemplarily shows that the target gamma curve may include one first interval, and the configuration range of the first interval may be 0-40 grayscales. In other embodiments of the present disclosure, the target gamma curve may also include other numbers of first intervals; and the configuration ranges of the first intervals may also be other configuration ranges, which may be configured according to the deviation between actual gamma curve and the standard gamma curve.

Figure 3:
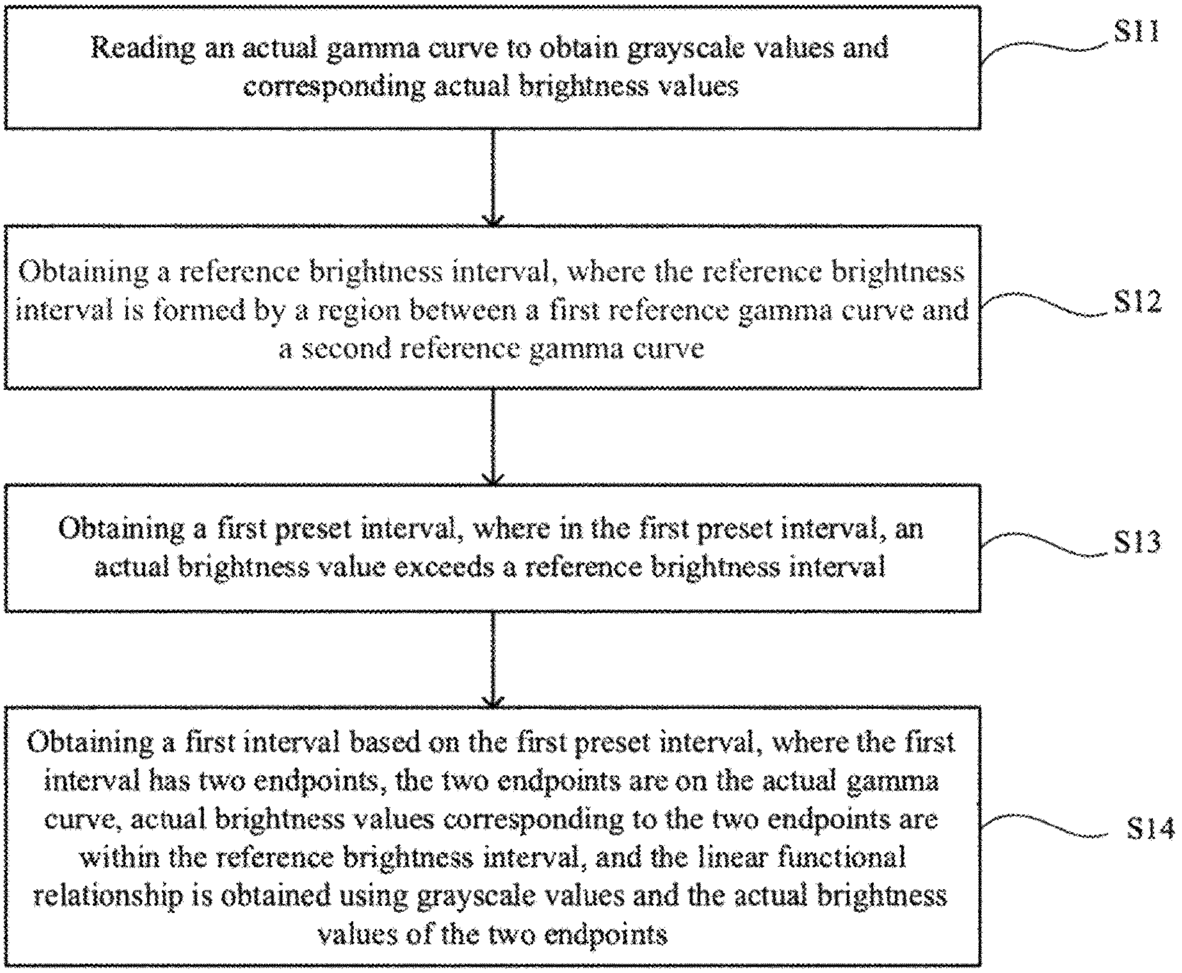
FIG. 3 illustrates another flowchart of a gamma tuning method according to various embodiments of the present disclosure.

FIG. 3 illustrates another flowchart of a gamma tuning method according to various embodiments of the present disclosure. Referring to FIG. 3, in some optional embodiments, the gamma tuning method may also include following exemplary steps.

At S11, actual gamma curve may be read to obtain the grayscale values and corresponding actual brightness values.

In above-mentioned exemplary step S11, actual gamma curve displayed by the display panel may be read first, thereby obtaining the grayscale values and actual brightness value corresponding to each grayscale value.

At S12, a reference brightness interval may be obtained. The reference brightness interval may be a region between the first reference gamma curve and the second reference gamma curve.

In above-mentioned exemplary step S12, the reference brightness interval may be obtained based on the first reference gamma curve and the second reference gamma curve. That is, the reference brightness interval may be the region between the first reference gamma curve and the second reference gamma curve. The standard gamma curve may be in the reference brightness interval.

At S13, the first preset interval may be obtained. In the first preset interval, actual brightness value may exceed the reference brightness interval.

In above-mentioned exemplary step S13, the first preset interval may be obtained based on actual brightness curve and the reference brightness interval. In the first preset interval, actual brightness value may be greater than the reference brightness interval. Exemplarily, the brightness value corresponding to the first reference gamma curve may be less than the brightness value corresponding to the standard gamma curve at same grayscale value; and the brightness value corresponding to the second reference gamma curve may be greater than the brightness value corresponding to the standard gamma curve at same grayscale value. Actual brightness value of each grayscale value may be compared with the brightness value based on the first reference gamma curve and the second reference gamma curve to find at least one first preset interval. That is, whether actual brightness value of each grayscale value is greater than the reference brightness interval may be determined to find at least one first preset interval. In the first preset interval, actual brightness value of each grayscale value may be less than corresponding brightness value based on the first reference gamma curve; or actual brightness value of each grayscale value may be greater than corresponding brightness value based on the second reference gamma curve.

At S14, the first interval may be obtained based on the first preset interval. The first interval may have two endpoints, the endpoints may be on actual gamma curve, and actual brightness values corresponding to the endpoints may be in the reference brightness interval. The linear function relationship may be obtained using the grayscale values and actual brightness values of two endpoints.

In above-mentioned exemplary step S14, the first interval may be obtained based on the first preset interval. In the first interval, the grayscale values and the target brightness values may have linear functional relationship. For example, the first interval may have two endpoints, the endpoints may be on actual gamma curve, and actual brightness values corresponding to the endpoints may be in the reference brightness interval. The linear function relationship may be obtained using the grayscale values and actual brightness values of two endpoints.

For example, actual gamma curve displayed by the display panel may be read first to obtain the grayscale value and actual brightness value corresponding to each grayscale value; and the reference brightness interval may be obtained based on the first reference gamma curve and the second reference gamma curve. That is, the reference brightness interval may be the region between the first reference gamma curve and the second reference gamma curve. The standard gamma curve may be in the reference brightness interval. Next, the first preset interval may be obtained based on actual brightness curve and the reference brightness interval. In the first preset interval, actual brightness value may be greater than the reference brightness interval. That is, in the first preset interval, the difference between actual brightness value corresponding to each grayscale value and the brightness value corresponding to the standard gamma curve may be relatively large. That also is, in the first preset interval, the gamma curve calculated and fitted based on the binding point grayscale may deviate greatly from the standard gamma curve. After the display panel is tuned according to the gamma curve calculated and fitted based on the binding point grayscale, the display effect may be poor.

The first interval may be obtained based on the first preset interval. In the first interval, the grayscale values and the target brightness values may have linear functional relationship. For example, the first interval may have two endpoints, the endpoints may be on actual gamma curve, and actual brightness values corresponding to the endpoints may be in the reference brightness interval. The linear function relationship may be obtained using the grayscale values and actual brightness values of two endpoints. That is, the first interval configured based on the first preset interval may be in the target gamma curve. In the first interval, the grayscale values and the target brightness values may have linear functional relationship. Therefore, in the first interval, the target gamma curve may be closer to the standard gamma curve than actual gamma curve. The first interval may be obtained based on the first preset interval. Correspondingly, in the first preset interval, the target gamma curve may be closer to the standard gamma curve than actual gamma curve. Therefore, the deviation between actual brightness of the display panel after tuning based on the target gamma curve and standard brightness that needs to be achieved may be effectively reduced, thereby effectively improving the display effect of the display panel.

Meanwhile, the first interval may have two endpoints, the endpoints may be on actual gamma curve, and actual brightness values corresponding to the endpoints may be in the reference brightness interval. The linear function relationship may be obtained using the grayscale values and actual brightness values of two endpoints. Therefore, it realizes that the target gamma curve may be closer to the standard gamma curve than actual gamma curve in the first preset interval. There is no need to configure more than two binding point grayscales in the first preset interval to adjust the target gamma curve, which may effectively reduce the calculation capacity of the driving chip and reduce the power consumption of the driving chip.

In some optional embodiments, corresponding relationship between each grayscale value in the first reference gamma curve and corresponding brightness value may satisfy the formula $L(gray)/L255=(gray/255)^{2.3}$; and corresponding relationship between each grayscale value in the second reference gamma curve and corresponding brightness value may satisfy the formula $L(gray)/L255=(gray/255)^{2.1}$.

For example, the first reference gamma curve may be a gamma curve of gamma 2.3; and corresponding relationship between each grayscale value in the first reference gamma curve and corresponding brightness value may satisfy the formula $L(gray)/L255=(gray/255)^{2.3}$. The second reference gamma curve may be a gamma curve of gamma 2.1; and corresponding relationship between each grayscale value in the second reference gamma curve and corresponding brightness value may satisfy the formula $L(gray)/L255=(gray/255)^{2.1}$. The standard gamma curve of gamma 2.2 may be in the reference brightness interval formed by the region between the first reference gamma curve and the second reference gamma curve. At this point, in the first preset interval, actual brightness value of each grayscale value may be less than corresponding brightness value based on the first reference gamma curve, or actual brightness value of each grayscale value may be greater than corresponding brightness value based on the second reference gamma curve. In the first preset interval, the difference between actual brightness value corresponding to each grayscale value and the brightness value corresponding to the standard gamma curve may be relatively large. Therefore, the first interval may be obtained based on the first preset interval. In the first interval, the grayscale values and the target brightness values have linear functional relationship.

It should be noted that, in one embodiment, it exemplarily illustrates that the first reference gamma curve may be the gamma curve of gamma 2.3, and the second reference gamma curve may be the gamma curve of gamma 2.1. In other embodiments of the present disclosure, when the standard gamma curve is a gamma curve of gamma 2.2 or no other gamma curve, the first reference gamma curve and the second reference gamma curve may also be configured to other gamma curves based on tuning accuracy requirement, which only needs to satisfy that the standard gamma curve may be in the reference brightness interval formed by the region between the first reference gamma curve and the second reference gamma curve and may not be limited in the present disclosure.

In some optional embodiments, the maximum difference in grayscales in the first interval may be greater than the maximum difference in grayscales in the first preset interval.

For example, in the first preset interval, the difference between actual brightness value corresponding to each grayscale value and the brightness value corresponding to the standard gamma curve may be relatively large, and two endpoints of the first preset interval may exceed the reference brightness interval. The first interval may be obtained based on the first preset interval, and the maximum grayscale difference in the first interval may be greater than the maximum grayscale difference in the first preset interval. Therefore, it realizes that actual brightness values corresponding to two endpoints of the first interval may be in the reference brightness interval. At this point, the grayscale range corresponding to the first interval may include the grayscale range corresponding to the first preset interval. In the first interval, the grayscale values and the target brightness values may have linear functional relationship. Therefore, in the first interval, the target gamma curve may be closer to the standard gamma curve than actual gamma curve. In the first interval, the grayscale value and the target brightness value have linear functional relationship. Therefore, in the first interval, the target gamma curve is closer to the standard gamma curve than actual gamma curve. Therefore, the deviation between actual brightness of the display panel after tuning based on the target gamma curve and standard brightness that needs to be achieved may be effectively reduced, thereby effectively improving the display effect of the display panel.

Figure 4:
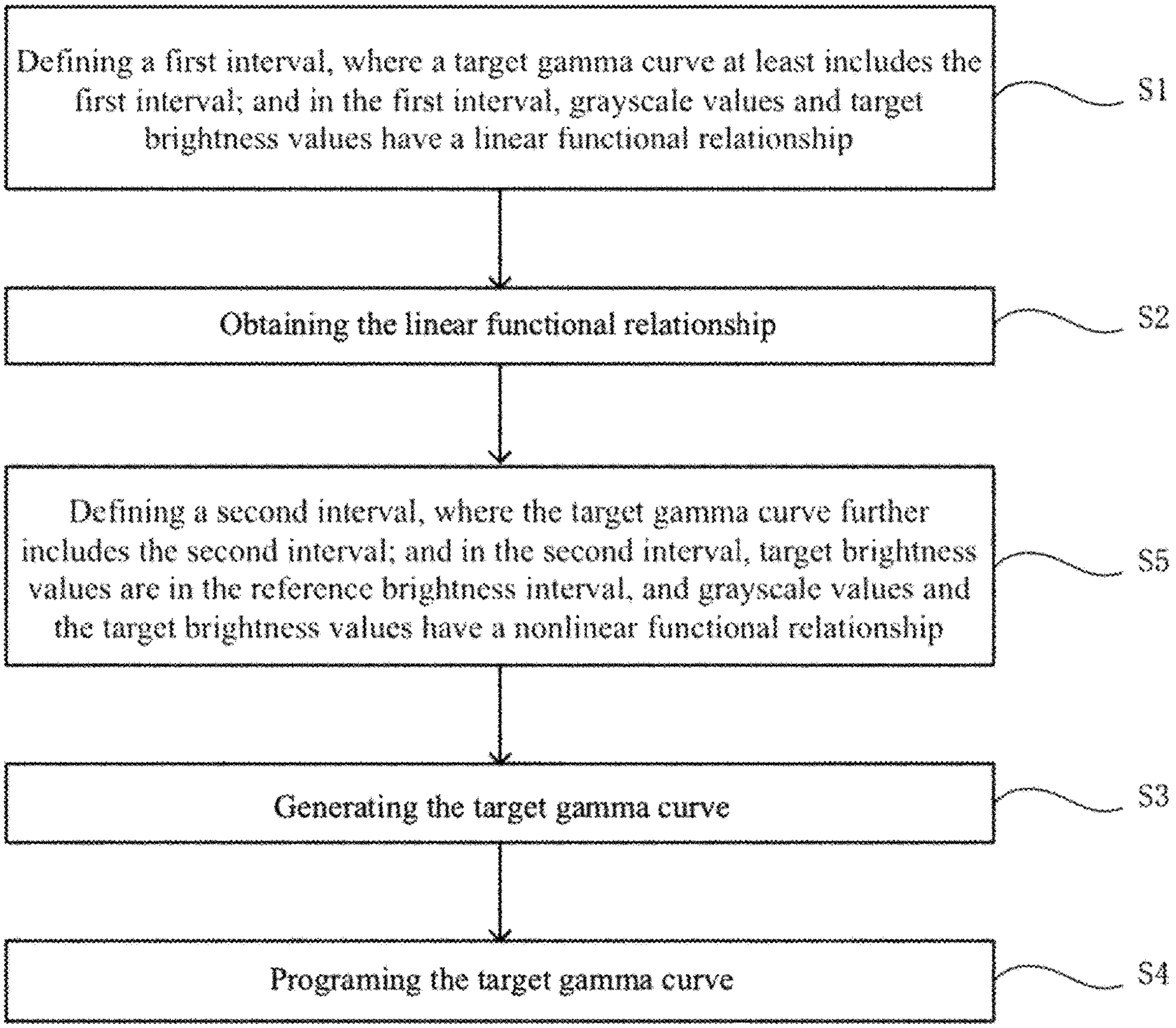
FIG. 4 illustrates another flowchart of a gamma tuning method according to various embodiments of the present disclosure.

FIG. 4 illustrates another flowchart of a gamma tuning method according to various embodiments of the present disclosure. Referring to FIG. 4, in some optional embodiments, the gamma tuning method may also include exemplary step S5. At S5, the second interval may be defined, where the target gamma curve may also include the second interval; and in the second interval, the target brightness value may be in the reference brightness interval, and the grayscale values and the target brightness values may have nonlinear functional relationship.

For example, in the gamma tuning method provided by embodiments of the present disclosure, the first interval of the target gamma curve may be defined based on the deviation between actual gamma curve and the standard gamma curve; and in the first interval, actual brightness may deviate greatly from the standard brightness that needs to be achieved. Next, the first interval may be configured in the target gamma curve, and the grayscale value and the target brightness value may have linear functional relationship, such that the target gamma curve may be closer to the standard gamma curve than actual gamma curve. Therefore, the deviation between actual brightness of the display panel after tuning based on the target gamma curve and standard brightness that needs to be achieved may be effectively reduced, thereby effectively improving the display effect of the display panel. Meanwhile, the second interval of the target gamma curve may be defined based on the deviation between actual gamma curve and the standard gamma curve. In the second interval, the target brightness value may be in the reference brightness interval. That is, in the second interval, the deviation between actual brightness and the required standard brightness may be relatively small. The second interval may be configured in the target gamma curve, and the grayscale values and the target brightness values may have nonlinear functional relationship. That is, in the second interval of the target gamma curve, there is no need to configure the linear function relationship between the grayscale values and the target brightness values, and the gamma curve calculated and fitted based on the binding point grayscale may be directly reused, which may effectively reduce the calculation capacity of the driving chip and reduce the power consumption of the driving chip.

Referring FIG. 2, in some optional embodiments, the nonlinear functional relationship may be consistent with the standard gamma curve.

For the brightness under same grayscale, the standard gamma curve may be between the first reference gamma curve and the second reference gamma curve.

For example, the standard gamma curve may be in the reference brightness interval formed by the region between the first reference gamma curve and the second reference gamma curve. In the second interval, the target brightness value may be in the reference brightness interval. That is, in the second interval, the deviation between actual brightness and the required standard brightness may be relatively small. Furthermore, in the second interval, the gamma curve calculated and fitted based on the binding point grayscale may be same as the standard gamma curve. At this point, in the second interval, the nonlinear functional relationship may directly reuse the part corresponding to the standard gamma curve, which may effectively reduce the configuration difficulty of the target gamma curve and reduce the calculation capacity and the power consumption of the driving chip.

For example, referring to FIG. 2, the configuration range of the second interval may be 40-80 grayscales. In the second interval, actual gamma curve may be coincided with the standard gamma curve. At this point, in the second interval, the nonlinear functional relationship between the grayscale values and the target brightness values may be consistent with the standard gamma curve.

In some optional embodiments, the target gamma curve may include a plurality of first intervals and a plurality of second intervals; at least one first interval and at least one second interval may be adjacent to each other; and the first interval and the second interval may have one same endpoint.

The target gamma curve may include the plurality of first intervals and the plurality of second intervals; and the first interval and the second interval which are adjacent to each other may have one same endpoint. When the first interval is before the second interval, the ending point of the first interval may be the starting point of the second interval. When the first interval is after the second interval, the ending point of the second interval may be the starting point of the first interval. That is, in the target gamma curve, the first interval and the second interval which are adjacent to each other may be connected, such that the transition between the first interval and the second interval which are connected may be smoother, and the grayscale transition may be smoother.

For example, referring to FIG. 2, the configuration range of the first interval may be 0-40 grayscales, and the configuration range of the second interval may be 40-80 grayscales. The first interval and the second interval may have one same endpoint.

In some optional embodiments, in the first interval, the target brightness values obtained using linear functional relationship may be at least partially in the reference brightness interval.

For example, the first interval may be obtained based on the first preset interval. In the first interval, the grayscale values and the target brightness values may have linear functional relationship. The first interval may have two endpoints, the endpoints may be on actual gamma curve, and actual brightness values corresponding to the endpoints may be in the reference brightness interval. The grayscale values and actual brightness values of two endpoints may be used to obtain linear function relationship. Through the configuration of the linear function relationship, a greater number of target brightness values in the first interval may be located in the reference brightness interval. As a result, the difference between the brightness value corresponding to each grayscale in the first interval and the brightness value that needs to be achieved may be reduced, thereby effectively improving the display effect of the display panel.

In some optional embodiments, in the first interval, two endpoints may be intersecting points of actual gamma curve and the standard gamma curve.

The standard gamma curve may be between the first reference gamma curve and the second reference gamma curve.

For example, in the gamma tuning method provided by embodiments of the present disclosure, two endpoints of the first interval may be searched based on the first preset interval. Whether the intersecting point is between actual gamma curve and the standard gamma curve by searching from two endpoints of the first preset interval at two sides. When the intersecting points of actual gamma curve and the standard gamma curve can be found on two sides of the first preset interval and when the grayscale range between two intersecting points includes the grayscale range of the first preset interval, two endpoints of the first interval may be the intersecting points of actual gamma curve and the standard gamma curve. At this point, the endpoints may be on actual gamma curve, and actual brightness values corresponding to the endpoints may be in the reference brightness interval. The linear function relationship may be obtained using the grayscale values and actual brightness values of two endpoints.

Exemplarily, referring to FIG. 2, two endpoints of the first interval (points corresponding to grayscale 0 and grayscale 40) may be the intersecting points of actual gamma curve and the standard gamma curve. At this point, the endpoint may be on actual gamma curve, and actual brightness values corresponding to the endpoints may be in the reference brightness interval. The linear function relationship may be obtained using the grayscale values and actual brightness values of two endpoints. Therefore, in the first interval, the target gamma curve may be closer to the standard gamma curve than actual gamma curve.

In some optional embodiments, the endpoint of the first interval may be the closest intersecting point to corresponding first preset interval.

For example, when a plurality of intersecting points is between actual gamma curve and the standard gamma curve, the endpoint of the first interval may be the closest intersecting point to corresponding first preset interval, such that the linear functional relationship between the grayscale values and the target brightness values in the first interval may be determined, which may be beneficial for reducing the configuration range of the first interval and simplifying the configuration complexity of the target gamma curve.

Optionally, whether an intersecting point is between actual gamma curve and the standard gamma curve may be determined by searching from two endpoints of the first preset interval at two sides. When the intersecting point of actual gamma curve and the standard gamma curve is found on one side of the first preset interval, one endpoint of the first interval may be the intersecting point of actual gamma curve and the standard gamma curve. When the intersecting point of actual gamma curve and the standard gamma curve cannot be found on another side of the first preset interval, another endpoint may be the intersecting point of actual gamma curve and the first reference gamma curve or the second reference gamma curve. Exemplarily, when the first preset interval and the first reference gamma curve are on same side of the standard gamma curve, another endpoint may be the intersecting point of actual gamma curve and the first reference gamma curve; and when the first preset interval and the second reference gamma curve are on same side of the standard gamma curve, another endpoint may be the intersecting point of actual gamma curve and the second reference gamma curve.

Figure 5:
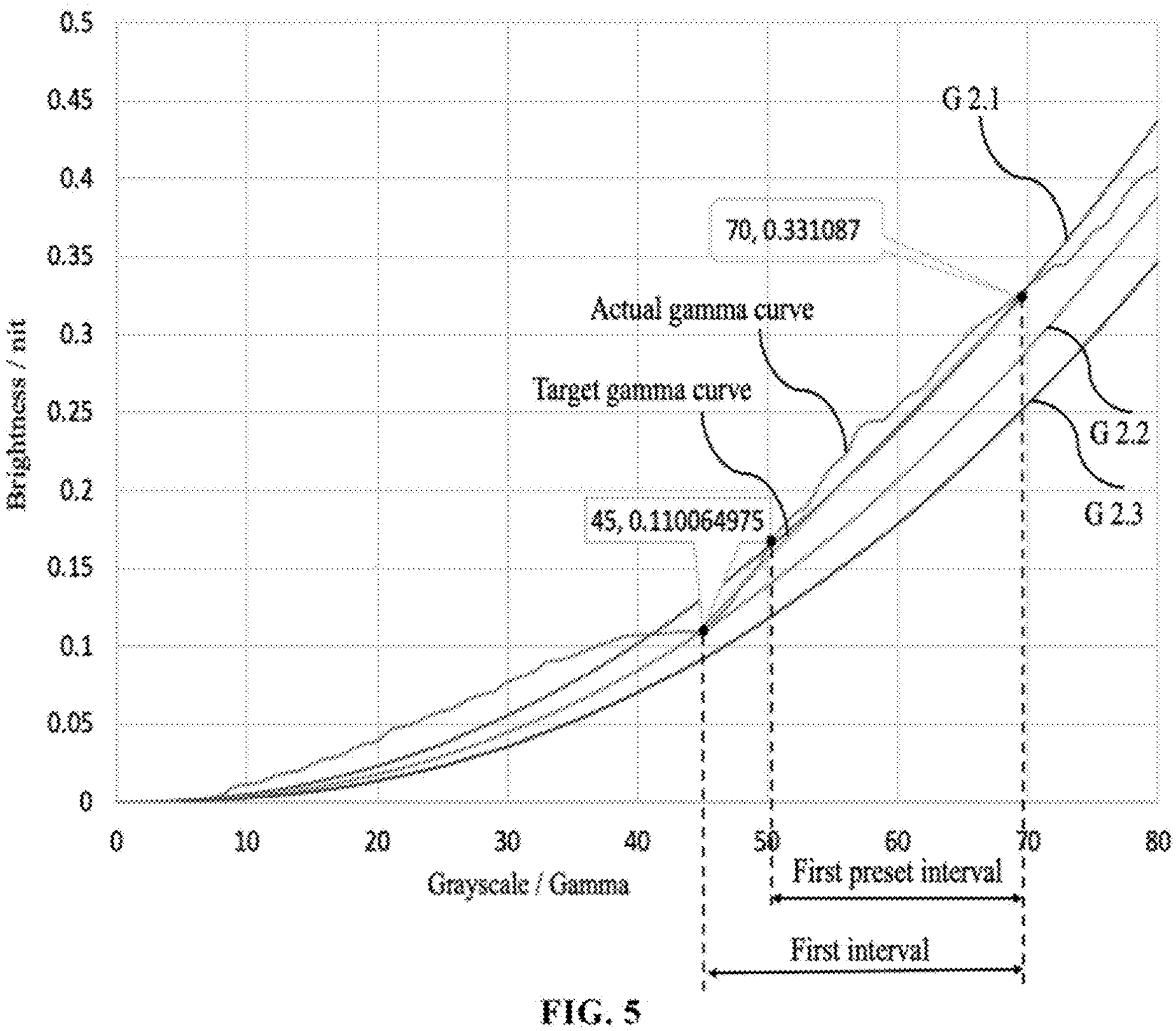
FIG. 5 illustrates another schematic of a gamma curve according to various embodiments of the present disclosure.

Exemplarily, referring to FIG. 5, FIG. 5 illustrates another schematic of a gamma curve according to various embodiments of the present disclosure. One endpoint of the first interval (the point corresponding to grayscale 45) may be the intersecting point of actual gamma curve and the standard gamma curve; and another endpoint of the first interval (the point corresponding to 70 grayscale) may be the intersecting point of actual gamma curve and the second reference gamma curve. At this point, the endpoints may be on actual gamma curve, and the linear function relationship may be obtained using the grayscale values and actual brightness values of two endpoints, thereby realizing that in the first interval, the target gamma curve may be closer to the standard gamma curve than actual gamma curve.

In some optional embodiments, in the first interval, one endpoint may be the intersecting point of actual gamma curve and the standard gamma curve, and actual brightness value of another endpoint may be in the reference brightness interval. The standard gamma curve may be between the first reference gamma curve and the second reference gamma curve.

For example, in the gamma tuning method provided by embodiments of the present disclosure, two endpoints of the first interval may be searched based on the first preset interval. Whether an intersecting point is between actual gamma curve and the standard gamma curve may be determined by searching from two endpoints of the first preset interval at two sides. When the intersecting point of actual gamma curve and the standard gamma curve is found on one side of the first preset interval, one endpoint of the first interval may be the intersecting point of actual gamma curve and the standard gamma curve. When the intersecting point of actual gamma curve and the standard gamma curve cannot be found on another side of the first preset interval, actual brightness value of another endpoint may be in the reference brightness interval. The grayscale range between two endpoints may include the grayscale range corresponding to the first preset interval. At this point, the endpoints may be on actual gamma curve, and actual brightness values corresponding to the endpoints may be in the reference brightness interval. The linear function relationship may be obtained using the grayscale values and actual brightness values of two endpoints.

Figure 6:
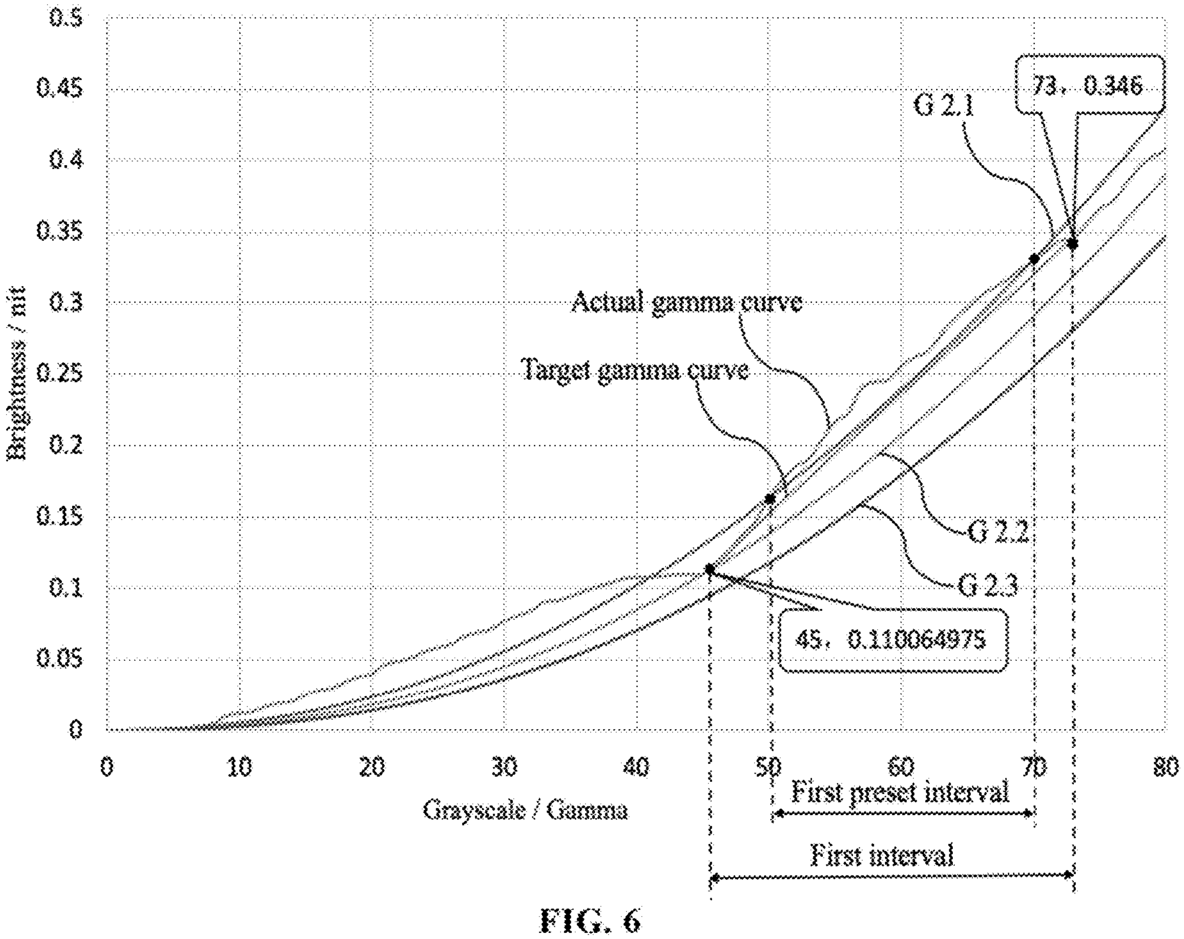
FIG. 6 illustrates another schematic of a gamma curve according to various embodiments of the present disclosure.

Exemplarily, referring to FIG. 6, FIG. 6 illustrates another schematic of a gamma curve according to various embodiments of the present disclosure. One endpoint of the first interval (the point corresponding to grayscale 45) may be the intersecting point of actual gamma curve and the standard gamma curve; and actual brightness value corresponding to another endpoint of the first interval (the point corresponding to the 73 grayscale) may be in the reference brightness interval. At this point, the endpoints may be on actual gamma curve, and the linear function relationship may be obtained using the grayscale values and actual brightness values of two endpoints, thereby realizing that in the first interval, the target gamma curve may be closer to the standard gamma curve than actual gamma curve.

In addition, when the intersecting point of actual gamma curve and the standard gamma curve cannot be found on one side of the first preset interval, the intersecting point of actual gamma curve and the standard gamma curve may be taken as the endpoint of the first interval correspondingly. When actual brightness value of the endpoint of the first interval is configured to be in the reference brightness interval, it achieves that the target brightness values corresponding to a greater number of grayscale values in the first interval may be in the reference brightness interval. Therefore, in the first interval, the target gamma curve may be closer to the standard gamma curve.

In some optional embodiments, in the first interval, one endpoint may be the intersecting point of actual gamma curve and the standard gamma curve, and the absolute value of the difference percentage between actual brightness value and the standard brightness value corresponding to another endpoint may be less than the first threshold. The standard gamma curve may be between the first reference gamma curve and the second reference gamma curve, and the standard brightness value corresponding to the endpoint may refer to a brightness value corresponding to the grayscale value of the endpoint based on the standard gamma curve.

For example, in the gamma tuning method provided by embodiments of the present disclosure, two endpoints of the first interval may be searched based on the first preset interval. Whether an intersecting point is between actual gamma curve and the standard gamma curve may be determined by searching from two endpoints of the first preset interval at two sides. When the intersecting point of actual gamma curve and the standard gamma curve is found on one side of the first preset interval, one endpoint of the first interval may be the intersecting point of actual gamma curve and the standard gamma curve. When the intersecting point of actual gamma curve and the standard gamma curve cannot be found on another side of the first preset interval, another endpoint may be searched based on the percentage difference between actual brightness value and the standard brightness value. In such way, another endpoint may be on actual gamma curve, and the absolute value of the difference percentage between actual brightness value corresponding to the endpoint and the standard brightness value may be less than the first threshold. The grayscale range between two endpoints may include the grayscale range corresponding to the first preset interval. At this point, the endpoints may be on actual gamma curve, and actual brightness values corresponding to the endpoints may be in the reference brightness interval. The linear function relationship may be obtained using the grayscale values and actual brightness values of two endpoints.

Exemplarily, referring to FIG. 6, one endpoint of the first interval (the point corresponding to the 45 grayscale) may be the intersecting point of actual gamma curve and the standard gamma curve, and another endpoint of the first interval (the point corresponding to the 73 grayscale) may be on actual gamma curve. At this point, the difference between actual brightness value corresponding to the 73 grayscale and the standard brightness value may be about 0.027 nit, and the absolute value of the difference percentage between actual brightness value corresponding to the 73 grayscale and the standard brightness value may be about 8.44%. The absolute value of the difference percentage between the corresponding actual brightness value and the standard brightness value may be less than the first threshold. The linear functional relationship may be obtained using the grayscale values and actual brightness values of two endpoints. Therefore, in the first interval, the target gamma curve may be closer to the standard gamma curve than actual gamma curve. In addition, when the intersecting point of actual gamma curve and the standard gamma curve cannot be found from two endpoints of the first preset interval from one side, another endpoint of the first interval may be quickly determined, which may be beneficial for the determination of the first interval and reducing the calculation capacity and the power consumption of the driving chip.

Optionally, the first threshold may be negatively correlated with corresponding grayscale value. That is, when the endpoint of the first interval is determined based on the absolute value of the difference percentage between corresponding actual brightness value and the standard brightness value, the first threshold may be negatively correlated with the grayscale value corresponding to the endpoint. At this point, the larger the grayscale value corresponding to the endpoint is, the smaller the first threshold used for comparison is. Therefore, it ensures that actual brightness value corresponding to the endpoint may be in the reference brightness interval, and the endpoint may be easily searched.

For example, in the grayscale range of 1-11, corresponding first threshold range may be about 74.04%-36.94%; in the grayscale range of 12-50, corresponding first threshold range may be about 36.94%-17.69%; in the grayscale range of 50-105, corresponding first threshold range may be about 17.69%-9.28%; in the grayscale range of 105-200, corresponding first threshold range may be about 9.28%-2.41%; and in the grayscale range of 200-255, corresponding first threshold range may be about 2.41%-0. It should be noted that, in one embodiment, it exemplarily shows the configuration ranges of the first threshold. In other embodiments of the present disclosure, the first thresholds may be configured to other ranges according to tuning accuracy requirement, which may not be described in detail herein.

In some optional embodiments, in the first interval, the absolute value of the difference percentage between actual brightness value corresponding to each of two endpoints and the standard brightness value may be less than the first threshold.

The standard brightness value corresponding to the endpoint may refer to a brightness value corresponding to the grayscale value of the endpoint based on the standard gamma curve. The standard gamma curve may be between the first reference gamma curve and the second reference gamma curve.

For example, in the gamma tuning method provided by embodiments of the present disclosure, two endpoints of the first interval may be searched based on the first preset interval. Whether an intersecting point is between actual gamma curve and the standard gamma curve may be determined by searching from two endpoints of the first preset interval at two sides. When the intersecting point of actual gamma curve and the standard gamma curve cannot be found on two sides of the first preset interval, two endpoints of the first interval may be found based on the percentage difference between actual brightness value and the standard brightness value, which may only need to satisfy that the endpoint may be on actual gamma curve, and the absolute value of the difference percentage between actual brightness value corresponding to the endpoint and the standard brightness value may be less than the first threshold. At this point, the endpoints may be on actual gamma curve, and actual brightness values corresponding to the endpoints may be in the reference brightness interval. The linear function relationship may be obtained using the grayscale values and actual brightness values of two endpoints.

Figure 7:
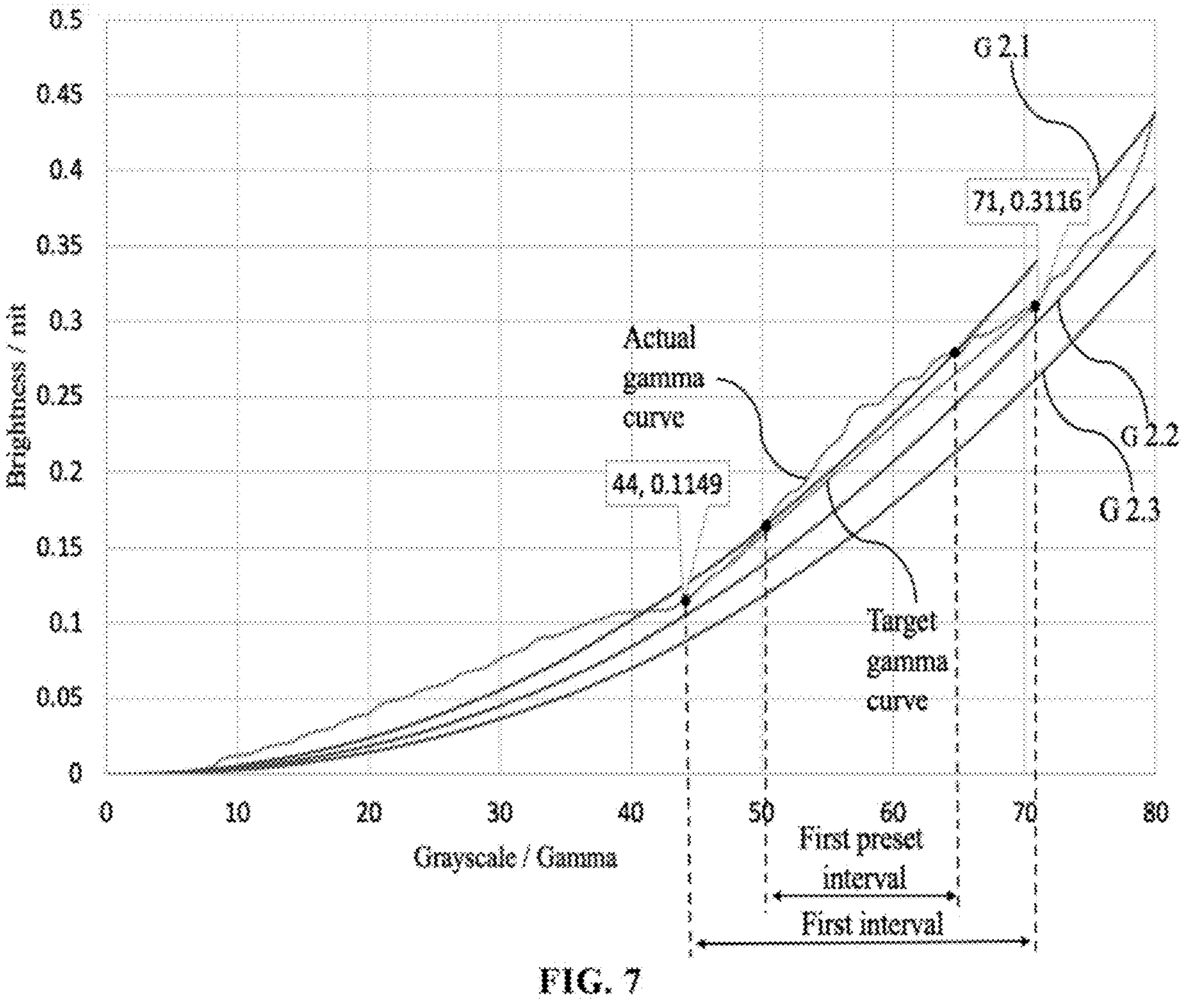
FIG. 7 illustrates another schematic of a gamma curve according to various embodiments of the present disclosure.

Exemplarily, referring to FIG. 7, FIG. 7 illustrates another schematic of a gamma curve according to various embodiments of the present disclosure. One endpoint of the first interval (the point corresponding to grayscale 44) may be on actual gamma curve. At this point, the difference between actual brightness value corresponding to the 44 grayscale and the standard brightness value may be about 0.006 nit. The absolute value of the difference percentage between actual brightness value corresponding to the 44 grayscale and the standard brightness value may be about 5.73%. The absolute value of the difference percentage between actual brightness value corresponding to the 44 grayscale and the standard brightness value may be less than the first threshold. Another endpoint of the first interval (the point corresponding to grayscale 71) may be also on actual gamma curve. At this point, the difference between actual brightness value corresponding to the 71 grayscale and the standard brightness value may be about 0.0115 nit. The absolute value of the difference percentage between actual brightness value corresponding to the 71 grayscale and the standard brightness value may be about 3.83%. The absolute value of the difference percentage between actual brightness value corresponding to the 71 grayscale and the standard brightness value may be less than the first threshold. The linear function relationship may be obtained using the grayscale values and actual brightness values of two endpoints. Therefore, in the first interval, the target gamma curve may be closer to the standard gamma curve than actual gamma curve. In addition, when the intersecting point of actual gamma curve and the standard gamma curve cannot be found from two endpoints of the first preset interval at two sides, two endpoints of the first interval may be quickly determined, which may be beneficial for determining the first interval, and reducing the calculation capacity and the power consumption of the driving chip.

Optionally, the first threshold may be negatively correlated with corresponding grayscale value. That is, when the endpoint of the first interval is determined based on the absolute value of the difference percentage between corresponding actual brightness value and the standard brightness value, the first threshold may be negatively correlated with the grayscale value corresponding to the endpoint. At this point, the larger the grayscale value corresponding to the endpoint is, the smaller the first threshold used for comparison is. Therefore, it ensures that actual brightness value corresponding to the endpoint may be in the reference brightness interval, and the endpoint may be easily searched.

For example, in the grayscale range of 1-11, corresponding first threshold range may be about 74.04%-36.94%; in the grayscale range of 12-50, corresponding first threshold range may be about 36.94%-17.69%; in the grayscale range of 50-105, corresponding first threshold range may be about 17.69%-9.28%; in the grayscale range of 105-200, corresponding first threshold range may be about 9.28%-2.41%; and in the grayscale range of 200-255, corresponding first threshold range may be about 2.41%-0. It should be noted that, in one embodiment, it exemplarily shows the configuration ranges of the first threshold. In other embodiments of the present disclosure, the first thresholds may be configured to other ranges according to tuning accuracy requirement, which may not be described in detail herein.

In some optional embodiments, the endpoints of the first interval may include an ending point; and actual brightness value corresponding to the ending point may be LV1.

Actual brightness value corresponding to next grayscale value corresponding to the ending point may be LV2, where LV2>LV1.

For example, in the first interval, the grayscale values and the target brightness values may have linear functional relationship, and the first interval may include two endpoints. The linear functional relationship may be obtained using the grayscale values and actual brightness values of two endpoints. That is, in the first interval, the greater the grayscale value is, the greater corresponding actual brightness value is. The endpoints of the first interval may include an ending point, and actual brightness value corresponding to the ending point may be LV1. That is, actual brightness value corresponding to the ending point of the first interval may be the maximum brightness value in actual brightness values corresponding to all grayscales in the first interval. The actual brightness value corresponding to a next grayscale value corresponding to the ending point may be LV2, where LV2>LV1. That is, actual brightness value corresponding to the ending point may be less than actual brightness value corresponding to the grayscale value of the next point corresponding to the ending point. When transitioning from the ending point of the first interval to the next grayscale value corresponding to the ending point, the transition may be smooth with desirable display effect.

Figure 8:
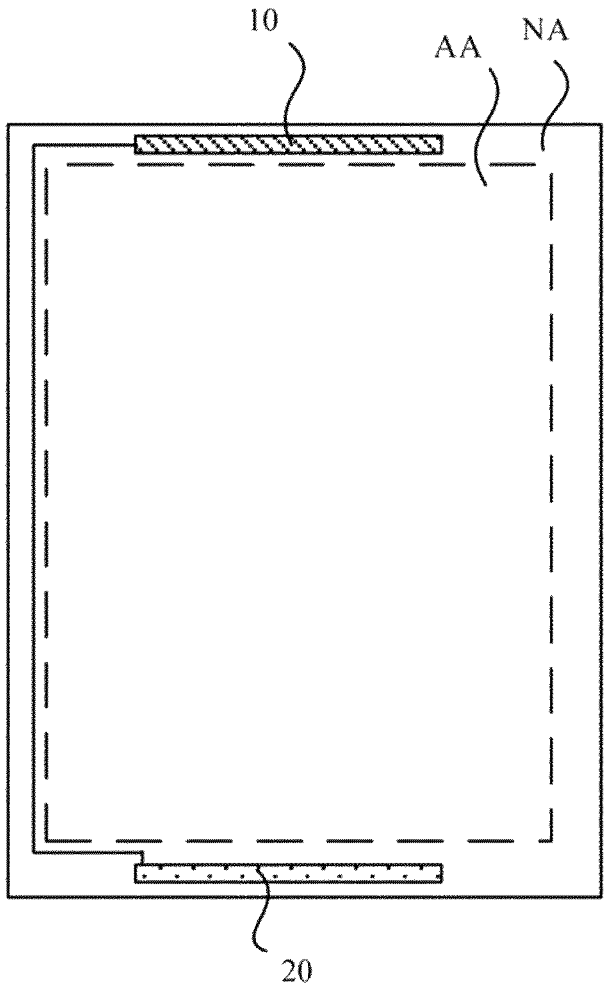
FIG. 8 illustrates a planar schematic of a display panel according to various embodiments of the present disclosure.
Figure 9:
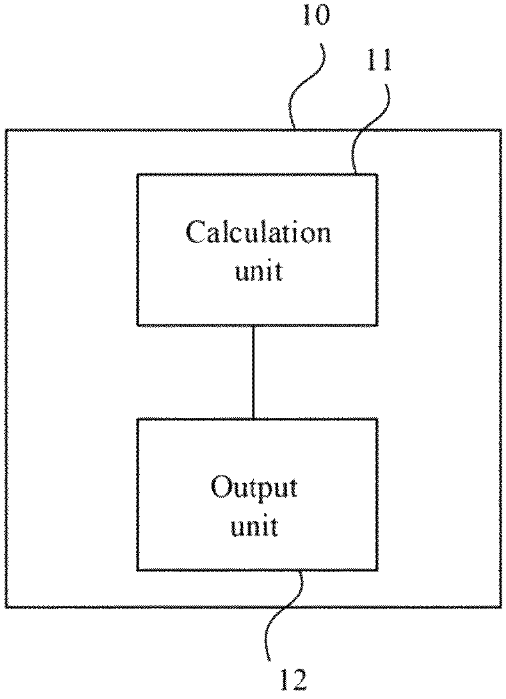
FIG. 9 illustrates a structural schematic of a gamma tuning apparatus according to various embodiments of the present disclosure.

FIG. 8 illustrates a planar schematic of a display panel according to various embodiments of the present disclosure; and FIG. 9 illustrates a structural schematic of a gamma tuning apparatus according to various embodiments of the present disclosure. Referring to FIGS. 8-9, embodiments provide a gamma tuning apparatus. The gamma tuning apparatus may include a plug-in module 10. The plug-in module 10 may be electrically connected to the driving chip 20. The plug-in module 10 may include a calculation unit 11 and an output unit 12.

The calculation unit 11 may be configured to define the first interval of the target gamma curve, where in the first interval, the grayscale values and the target brightness values may have linear functional relationship.

The output unit 12 may be configured to obtain the linear functional relationship, generate the target gamma curve, and transmit the target gamma curve to the driving chip 20.

The driving chip 20 may be configured to program the target gamma curve.

In the existing technology, after the display panel is tuned according to the gamma curve calculated and fitted based on the binding point grayscale, a deviation may be between actual gamma curve displayed by the display panel and the standard gamma curve that needs to be generated. The gamma tuning apparatus provided by embodiments of the present disclosure may be disposed in the display panel, the gamma tuning apparatus may include the plug-in module 10, and the plug-in module 10 may be electrically connected to the driving chip 20, thereby enabling the display panel to be tuned based on the target gamma curve, which may be beneficial for improving the display effect of the display panel. Optionally, the display panel may include a display region AA and a non-display region NA surrounding the display region AA, and the gamma tuning apparatus may be disposed in the non-display region NA.

For example, the gamma tuning apparatus provided by embodiments of the present disclosure may include the plug-in module 10. The plug-in module 10 may include the calculation unit 11 and the output unit 12. The calculation unit 11 may be configured to define the first interval of the target gamma curve. In the first interval, the grayscale values and the target brightness values may have the linear functional relationship. The output unit 12 may be configured to obtain the linear functional relationship, generate the target gamma curve, and transmit the target gamma curve to the driving chip 20. The driving chip 20 may be configured to program the target gamma curve. In such way, the display panel may be tuned based on the target gamma curve. The target gamma curve generated by the gamma tuning apparatus provided by embodiments of the present disclosure may be closer to the standard gamma curve. Therefore, after the display panel is tuned based on the target gamma curve, it is beneficial for improving the display effect of the display panel.

For example, in the gamma tuning apparatus provided by embodiments of the present disclosure, the calculation unit 11 may be configured to define the first interval of the target gamma curve based on the deviation between actual gamma curve and the standard gamma curve. In the first interval, actual brightness may deviate greatly from the standard brightness that needs to be achieved. Next, the first interval may be configured in the target gamma curve. In the first interval, the grayscale values and the target brightness values may have the linear functional relationship, such that the target gamma curve may be closer to the standard gamma curve than actual gamma curve. Therefore, the deviation between actual brightness of the display panel and the standard brightness that needs to be achieved after tuning based on the target gamma curve may be effectively reduced, thereby effectively improving the display effect of the display panel.

Figure 10:
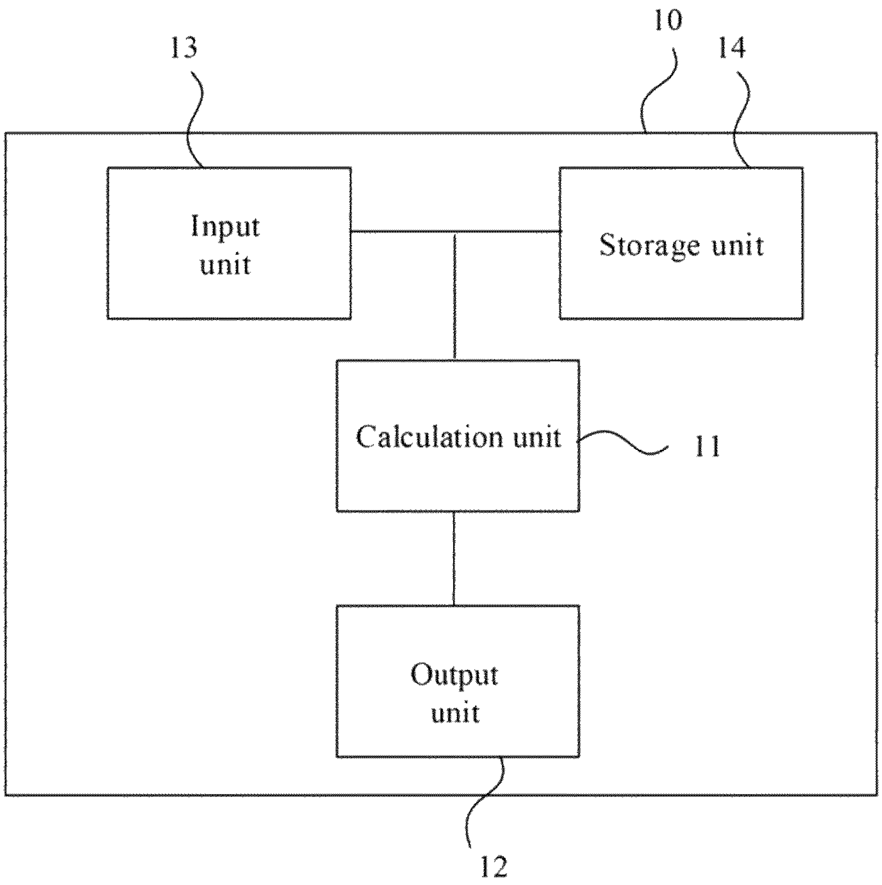
FIG. 10 illustrates another structural schematic of a gamma tuning apparatus according to various embodiments of the present disclosure.

FIG. 10 illustrates another structural schematic of a gamma tuning apparatus according to various embodiments of the present disclosure. Referring to FIGS. 8 and 10, in some optional embodiments, the plug-in module 10 may further include an input unit 13 and a storage unit 14.

The input unit 13 may be configured to read actual gamma curve and obtain the grayscale value and corresponding actual brightness value.

The storage unit 14 may be configured to store the first reference gamma curve and the second reference gamma curve.

The calculation unit 11 may be also configured to obtain the reference brightness interval, which may be formed by the region between the first reference gamma curve and the second reference gamma curve.

The calculation unit 11 may be further configured to obtain the first preset interval. In the first preset interval, actual brightness value may be greater than the reference brightness interval.

The calculation unit 11 may be further configured to obtain the first interval based on the first preset interval. The first interval may have two endpoints, two endpoints may be on actual gamma curve, and actual brightness values corresponding to two endpoints may be in the reference brightness interval. The linear function relationship may be obtained using the grayscale values and actual brightness values of two endpoints.

For example, in the gamma tuning apparatus provided by embodiments of the present disclosure, the plug-in module 10 may further include the input unit 13 and the storage unit 14. The input unit 13 may be configured to read actual gamma curve and obtain the grayscale value and corresponding actual brightness value. That is, the input unit 13 may first read actual gamma curve displayed by the display panel to obtain the grayscale values and actual brightness value corresponding to each grayscale value. The storage unit 14 may be configured to store the first reference gamma curve and the second reference gamma curve. Therefore, the calculation unit 11 may obtain the reference brightness interval based on the first reference gamma curve and the second reference gamma curve. That is, the reference brightness interval may be the region between the first reference gamma curve and the second reference gamma curve. In addition, the standard gamma curve may be in the reference brightness interval. In addition, the calculation unit 11 may obtain the first preset interval based on actual brightness curve and the reference brightness interval. In the first preset interval, actual brightness value may be greater than the reference brightness interval. That is, in the first preset interval, the gamma curve calculated and fitted based on the binding point grayscale may deviate greatly from the standard gamma curve. After the display panel is tuned according to the gamma curve calculated and fitted based on the binding point grayscale, the display effect may be poor.

The calculation unit 11 may obtain the first interval based on the first preset interval. In the first interval, the grayscale values and the target brightness values may have the linear functional relationship. For example, the first interval may have two endpoints, the endpoints may be on actual gamma curve, and actual brightness values corresponding to the endpoints may be in the reference brightness interval. The linear function relationship may be obtained using the grayscale values and actual brightness values of two endpoints. That is, the first interval configured based on the first preset interval may be in the target gamma curve. In the first interval, the grayscale values and the target brightness values may have the linear functional relationship. Therefore, in the first interval, the target gamma curve may be closer to the standard gamma curve than actual gamma curve. The first interval may be obtained based on the first preset interval. Correspondingly, in the first preset interval, the target gamma curve may be closer to the standard gamma curve than actual gamma curve. Therefore, the deviation between actual brightness of the display panel and the standard brightness that needs to be achieved after tuning based on the target gamma curve may be effectively reduced, thereby effectively improving the display effect of the display panel.

Meanwhile, the first interval may have two endpoints, the endpoints may be on actual gamma curve, and actual brightness values corresponding to the endpoints may be in the reference brightness interval. The linear function relationship may be obtained using the grayscale values and actual brightness values of two endpoints. Therefore, the first preset interval may be achieved, and the target gamma curve may be closer to the standard gamma curve than actual gamma curve. There is no need to configure more than two binding point grayscales in the first preset interval to adjust the target gamma curve, which may effectively reduce the calculation capacity of the driving chip and reduce the power consumption of the driving chip.

Figure 11:
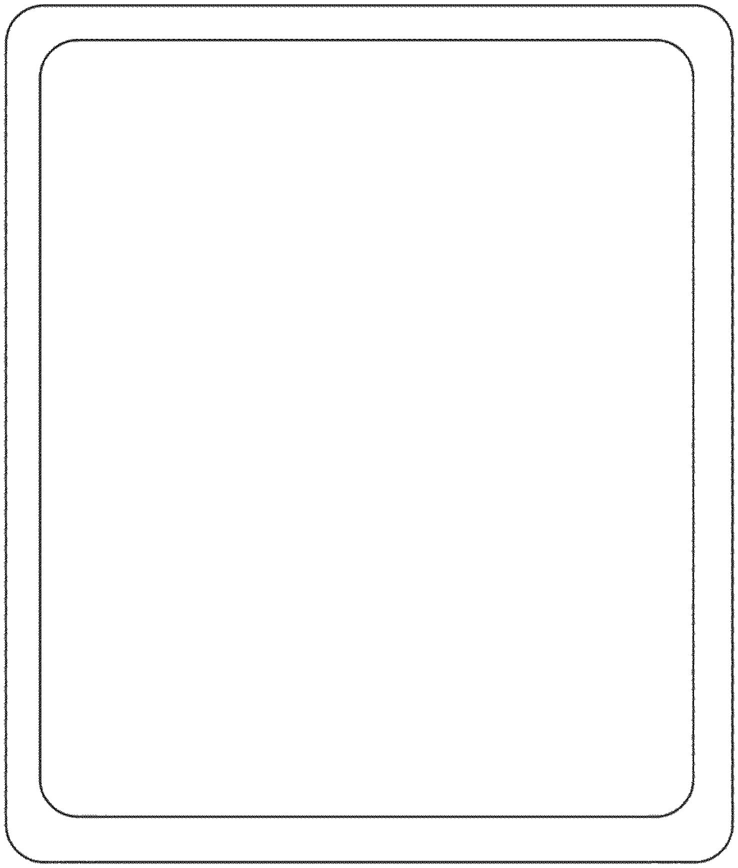
FIG. 11 illustrates a planar schematic of a display apparatus according to various embodiments of the present disclosure.

In some optional embodiments, referring to FIG. 11, FIG. 11 illustrates a planar schematic of a display apparatus according to various embodiments of the present disclosure. A display apparatus 1000 provided in embodiments of the present disclosure may include the gamma tuning apparatus provided in above-mentioned embodiments of the present disclosure. It may be understood that the display apparatus 1000 provided by embodiments of the present disclosure may be a display apparatus with a display function such as a mobile phone, a computer, a television, a vehicle-mounted display apparatus or the like, which may not be limited in the present disclosure. The display apparatus 1000 provided by embodiments of the present disclosure may have the beneficial effects of the gamma tuning apparatus provided by embodiments of the present disclosure, which may refer to specific description of the gamma tuning apparatus in above-mentioned embodiments and may not be described in detail herein.

It may be seen from above-mentioned embodiments that the gamma tuning method, the gamma tuning method apparatus, and the display apparatus provided by the present disclosure at least achieve the following beneficial effects.

In the gamma tuning method provided by the present disclosure, the target gamma curve close to the standard gamma curve may be generated. Therefore, after the display panel is tuned based on the target gamma curve, it is beneficial for improving the display effect of the display panel. For example, in the gamma tuning apparatus provided by embodiments of the present disclosure, the first interval of the target gamma curve may be defined based on the deviation between actual gamma curve and the standard gamma curve. In the first interval, actual brightness may deviate greatly from the standard brightness that needs to be achieved. Next, the first interval may be configured in the target gamma curve. In the first interval, the grayscale values and the target brightness values may have the linear functional relationship, such that the target gamma curve may be closer to the standard gamma curve than actual gamma curve. Therefore, the deviation between actual brightness of the display panel and the standard brightness that needs to be achieved after tuning based on the target gamma curve may be effectively reduced, thereby effectively improving the display effect of the display panel.

Although some embodiments of the present disclosure have been described in detail through various embodiments, those skilled in the art should understand that above embodiments may be for illustration only and may not be intended to limit the scope of the present disclosure. Those skilled in the art should understood that modifications may be made to above embodiments without departing from the scope and spirit of the present disclosure. The scope of the present disclosure may be defined by the appended claims.

What is claimed is:

1. A gamma tuning method, comprising:

defining a first interval, wherein a target gamma curve at least includes the first interval; and in the first interval, grayscale values and target brightness values have a linear functional relationship;

obtaining the linear functional relationship;

generating the target gamma curve;

programing the target gamma curve;

reading an actual gamma curve to obtain grayscale values and corresponding actual brightness values;

obtaining a reference brightness interval, wherein the reference brightness interval is formed by a region between a first reference gamma curve and a second reference gamma curve;

obtaining a first preset interval, wherein in the first preset interval, an actual brightness value exceeds the reference brightness interval; and obtaining the first interval based on the first preset interval, wherein the first interval has two endpoints which are on the actual gamma curve, actual brightness values corresponding to the two endpoints are in the reference brightness interval, and the linear functional relationship is obtained using grayscale values and the actual brightness values of the two endpoints.

2. The gamma tuning method according to claim 1, wherein:

a maximum grayscale difference in the first interval is greater than a maximum grayscale difference in the first preset interval.

3. The gamma tuning method according to claim 1, further including:

defining a second interval, wherein the target gamma curve further includes the second interval; and in the second interval, target brightness values are in the reference brightness interval, and grayscale values and the target brightness values have a nonlinear functional relationship.

4. The gamma tuning method according to claim 3, wherein:

the nonlinear functional relationship is consistent with a standard gamma curve, wherein for brightness under same grayscales, the standard gamma curve is between the first reference gamma curve and the second reference gamma curve.

5. The gamma tuning method according to claim 3, wherein:

the target gamma curve includes a plurality of first intervals and a plurality of second intervals; at least one first interval is adjacent to at least one second interval; and a first interval of the plurality of first intervals and a second interval of the plurality of second intervals have a same endpoint.

6. The gamma tuning method according to claim 1, wherein:

in the first interval, at least a part of target brightness values obtained using linear functional relationship is in the reference brightness interval.

7. The gamma tuning method according to claim 1, wherein:

in the first interval, the two endpoints are intersecting points of the actual gamma curve and a standard gamma curve, wherein the standard gamma curve is between the first reference gamma curve and the second reference gamma curve.

8. The gamma tuning method according to claim 7, wherein:

an endpoint in the first interval is a nearest intersecting point corresponding to the first preset interval.

9. The gamma tuning method according to claim 1, wherein:

in the first interval, one of the two endpoints is an intersecting point of the actual gamma curve and a standard gamma curve, and an actual brightness value of another one the two endpoints is in the reference brightness interval, wherein the standard gamma curve is between the first reference gamma curve and the second reference gamma curve.

10. The gamma tuning method according to claim 1, wherein:

in the first interval, one of the two endpoints is an intersecting point of the actual gamma curve and a standard gamma curve, and an absolute value of a difference percentage between an actual brightness value and a standard brightness value corresponding to another one of the two endpoints is less than a first threshold, wherein the standard gamma curve is between the first reference gamma curve and the second reference gamma curve, and a standard brightness value corresponding to an endpoint refers to a brightness value corresponding to a grayscale value of the endpoint based on the standard gamma curve.

11. The gamma tuning method according to claim 1, wherein:

in the first interval, an absolute value of a difference percentage between an actual brightness value and a standard brightness value corresponding to each of the two endpoints is less than a first threshold, wherein a standard brightness value corresponding to an endpoint refers to a brightness value corresponding to a grayscale value of the endpoint based on the standard gamma curve; and the standard gamma curve is between the first reference gamma curve and the second reference gamma curve.

12. The gamma tuning method according to claim 10, wherein:

the first threshold is negatively correlated with the grayscale value corresponding to another one of the two endpoints.

13. The gamma tuning method according to claim 11, wherein:

the first threshold is negatively correlated with the grayscale value corresponding to another one of the two endpoints.

14. The gamma tuning method according to claim 1, wherein:

the two endpoints of the first interval includes an ending point, and an actual brightness value corresponding to the ending point is LV1; and an actual brightness value of a next grayscale value corresponding to a grayscale value of the ending point is LV2, wherein LV2>LV1.

15. The gamma tuning method according to claim 1, wherein:

a corresponding relationship between each grayscale value in the first reference gamma curve and a corresponding brightness value satisfies a formula of $L(gray)/L255=(gray/255)^{2.3}$; and a corresponding relationship between each grayscale value in the second reference gamma curve and a corresponding brightness value satisfies the formula of $L(gray)/L255=(gray/255)^{2.1}$, wherein gray denotes a grayscale value in the first reference gamma curve or the second reference gamma curve, L(gray) denotes a brightness value corresponding the grayscale value, and L255 refers to a brightness value corresponding to a grayscale 255.

16. A gamma tuning apparatus, comprising:

a plug-in module, wherein the plug-in module is electrically connected to a driving chip and includes a calculation unit and an output unit, wherein:

the calculation unit is configured to define a first interval of a target gamma curve, wherein in the first interval, grayscale values and target brightness values have a linear functional relationship;

the output unit is configured to obtain the linear functional relationship, generate the target gamma curve and transmit the target gamma curve to the driving chip;

the driving chip is configured to program the target gamma curve;

the plug-in module further includes an input unit and a storage unit;

the input unit is configured to read an actual gamma curve to obtain grayscale values and corresponding actual brightness values;

the storage unit is configured to store a first reference gamma curve and a second reference gamma curve;

the calculation unit is further configured to obtain a reference brightness interval, wherein the reference brightness interval is formed by a region between the first reference gamma curve and the second reference gamma curve;

the calculation unit is further configured to obtain a first preset interval, wherein in the first preset interval, an actual brightness value exceeds the reference brightness interval; and the calculation unit is further configured to obtain the first interval based on the first preset interval, wherein the first interval has two endpoints which are on the actual gamma curve, actual brightness values corresponding to the two endpoints are in the reference brightness interval, and the linear functional relationship is obtained using grayscale values and the actual brightness values of the two endpoints.

17. A display apparatus, comprising:

a gamma tuning apparatus, comprising:

a plug-in module, wherein the plug-in module is electrically connected to a driving chip and includes a calculation unit and an output unit, wherein:

the calculation unit is configured to define a first interval of a target gamma curve, wherein in the first interval, grayscale values and target brightness values have a linear functional relationship;

the output unit is configured to obtain the linear functional relationship, generate the target gamma curve and transmit the target gamma curve to the driving chip;

the driving chip is configured to program the target gamma curve;

the plug-in module further includes an input unit and a storage unit;

the input unit is configured to read an actual gamma curve to obtain grayscale values and corresponding actual brightness values;

the storage unit is configured to store a first reference gamma curve and a second reference gamma curve;

the calculation unit is further configured to obtain a reference brightness interval, wherein the reference brightness interval is formed by a region between the first reference gamma curve and the second reference gamma curve;

the calculation unit is further configured to obtain a first preset interval, wherein in the first preset interval, an actual brightness value exceeds the reference brightness interval; and the calculation unit is further configured to obtain the first interval based on the first preset interval, wherein the first interval has two endpoints which are on the actual gamma curve, actual brightness values corresponding to the two endpoints are in the reference brightness interval, and the linear functional relationship is obtained using grayscale values and the actual brightness values of the two endpoints.

* * * * *